United States Patent
Choi et al.

(10) Patent No.: US 8,767,816 B2
(45) Date of Patent: Jul. 1, 2014

(54) SPATIAL PREDICTION METHOD AND APPARATUS IN LAYERED VIDEO CODING

(75) Inventors: Woong-Il Choi, Hwaseong-si (KR); Dae-Sung Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 838 days.

(21) Appl. No.: 12/834,154

(22) Filed: Jul. 12, 2010

(65) Prior Publication Data

US 2011/0007806 A1   Jan. 13, 2011

Related U.S. Application Data

(60) Provisional application No. 61/224,603, filed on Jul. 10, 2009.

(51) Int. Cl.
*H04N 7/50* (2006.01)

(52) U.S. Cl.
USPC ............................................................. 375/240

(58) Field of Classification Search
USPC ..................................................... 375/240.16
See application file for complete search history.

(56) References Cited

U.S. PATENT DOCUMENTS

| | | | |
|---|---|---|---|
| 5,515,377 A * | 5/1996 | Horne et al. | 370/395.64 |
| 6,842,483 B1 * | 1/2005 | Au et al. | 375/240.16 |
| 7,450,641 B2 * | 11/2008 | Sun et al. | 375/240.16 |
| 7,613,364 B2 * | 11/2009 | Kang et al. | 382/300 |
| 7,643,559 B2 * | 1/2010 | Kato et al. | 375/240.23 |
| 8,374,239 B2 * | 2/2013 | Yin et al. | 375/240.12 |
| 8,467,459 B2 | 6/2013 | Yin et al. | |
| 2006/0159354 A1 * | 7/2006 | Kim et al. | 382/238 |
| 2007/0071092 A1 | 3/2007 | Chin | |
| 2007/0147494 A1 * | 6/2007 | Shimauchi et al. | 375/240.1 |
| 2007/0206931 A1 * | 9/2007 | Barbieri et al. | 386/109 |
| 2007/0291847 A1 * | 12/2007 | Shimauchi et al. | 375/240.16 |
| 2008/0225952 A1 | 9/2008 | Wang et al. | |
| 2008/0260043 A1 * | 10/2008 | Bottreau et al. | 375/240.26 |

(Continued)

FOREIGN PATENT DOCUMENTS

| | | | |
|---|---|---|---|
| JP | 2004-140473 A | 5/2004 | |
| JP | 2004-304724 A | 10/2004 | |

(Continued)

OTHER PUBLICATIONS

International Search Report issued in PCT/KR2010/004503, dated Jan. 26, 2011.

(Continued)

*Primary Examiner* — Sath V Perungavoor
*Assistant Examiner* — Howard D Brown, Jr.
(74) *Attorney, Agent, or Firm* — Sughrue Mion, PLLC

(57) ABSTRACT

A spatial prediction method for coding a residual image in layered video coding. The spatial prediction method includes selecting at least one of a default mode, a horizontal mode and a vertical mode as a spatial prediction mode, taking into account an activity of at least one adjacent block located adjacent to a first block among blocks included in the residual image; and coding differences between pixels of the first block and pixels of a prediction bock constructed by one of the selected at least one or more spatial prediction modes. The at least one adjacent block includes a first adjacent block located on the left of the first block and a second adjacent block located on the top of the first block.

14 Claims, 5 Drawing Sheets

(56) References Cited

U.S. PATENT DOCUMENTS

| | | |
|---|---|---|
| 2008/0304763 A1 | 12/2008 | Nagori |
| 2009/0110070 A1 | 4/2009 | Takahashi et al. |
| 2010/0080284 A1* | 4/2010 | Lee et al. .............. 375/240.02 |
| 2011/0090969 A1* | 4/2011 | Sung et al. .............. 375/240.25 |
| 2013/0064296 A1 | 3/2013 | Sun et al. |

FOREIGN PATENT DOCUMENTS

| | | |
|---|---|---|
| JP | 2005-528047 A | 9/2005 |
| JP | 2008-516556 A | 5/2008 |
| JP | 2009-111520 A | 5/2009 |
| JP | 2009-111691 A | 5/2009 |

OTHER PUBLICATIONS

Communication dated Apr. 3, 2013 issued by the European Patent Office in counterpart European Patent Application No. 10797336.4.

Huang, et al., "Fast H.264 Mode Decision Using Previously Coded Information", Tenth IEEE International Symposium on Multimedia, Dec. 15, 2008, pp. 82-88, XP031403518.

Qiong, et al., "Improved fast intra prediction algorithm of H.264/AVC", Journal of Zhejiang university Science A; An Int. Applied Physics & Engineering Journal, Jan. 1, 2006, vol. 7, No. 1, pp. 101-105, XP019385055.

"Text Description of Joint Model Reference Encoding Methods and Decoding Concealment Methods", Joint Video Team (JVT) of ISO/IEC MPEG and ITU-T VCEG, Jan. 21, 2005, 43 pgs total, XP030005946.

Kim, et al., Fast intra-mode decision in H.264 video coding using simple directional masks, Visual Communications and Image Processing, Jul. 12, 2005, pp. 1071-1079, XP030080949.

Liu, et al., "Improved Intra Prediction for H.264/AVC Scalable Extension", Multimedia Signal Processing, Oct. 1, 2007, pp. 247-250, XP031224823.

Chen, et al., "Using H.264 Coded Block Patterns for Fast Inter-Mode Selection", Multimedia and Expo, Jun. 23, 2008, pp. 721-724, XP031312823.

"Joint Scalable Video Model JSVM-12 text", Joint Video Team (JVT) of ISO/IEC MPEG & ITU-T VCEG, 25th Meeting, Mar. 11, 2008, pp. 1-113, XP030007295.

"Text of Final Committee Draft of Joint Video Specification (ITU-T Rec. H.264 ISO/IEC 14496-10 AVC", Int. Organisation for Standardisation Organisation Internationale De Normalisation ISO/IEC JTC1/SC29/WG11 Coding of Moving Pictures and Audio, 207 pgs total, Aug. 11, 2002, XP030012343.

Communication dated May 28, 2013 issued by the Japanese Patent Office in counterpart Japanese Patent Application No. 2012-519482.

* cited by examiner

SPATIAL PREDICTION METHOD AND APPARATUS IN LAYERED VIDEO CODING

CROSS-REFERENCE TO RELATED APPLICATIONS

This application claims the benefit under 35 U.S.C. §119(a) of a U.S. Provisional Patent Application 61/224,603, filed in the United States Patent and Trademark Office on Jul. 10, 2009, the entire disclosure of which is hereby incorporated by reference.

BACKGROUND

1. Field

The exemplary embodiments relate generally to a layered video coding (also known as hierarchical video coding) method and apparatus, and more particularly, to a spatial prediction method and apparatus in layered video coding.

2. Description of the Related Art

In general, the codec technology has been used to compress audio and video data. Dependence on the codec technology is very high especially in video processing technologies in which large amount of data is processed.

Meanwhile, since one of the important factors to evaluate performance in the codec technology is compression efficiency, many efforts have been made to increase a data compression rate by means of the codec.

The codecs widely used for video processing can process 4:2:0 videos or videos with a bit depth of 8 bits. Meanwhile, studies on new codecs are underway, which can process high-definition videos, a video format of which is extended to 4:2:2 or 4:4:4 videos, or a bit depth of which is extended to 16 bits. In addition, much research have been made to enable the new codecs to efficiently code and decode input videos having all possible video formats or bit depths.

SUMMARY

An aspect of the exemplary embodiments is to address at least the above-mentioned problems and/or disadvantages and to provide at least the advantages described below. Accordingly, an aspect of the exemplary embodiments is to provide a spatial prediction method and apparatus for efficiently coding generated residual images in layered video coding.

Another aspect of the exemplary embodiments is to provide a spatial prediction method and apparatus for coding input videos so as to increase compression efficiency thereof in layered video coding.

In accordance with one aspect of the exemplary embodiments, there is provided a spatial prediction method for coding a residual image in layered video coding, the method including selecting at least one of a default mode, a horizontal mode and a vertical mode as a spatial prediction mode, taking into account an activity of at least one adjacent block located adjacent to a first block among blocks included in the residual image; and coding differences between pixels of the first block and pixels of a prediction bock constructed by one of the selected at least one or more spatial prediction modes. The at least one adjacent block includes a first adjacent block located on the left of the first block and a second adjacent block located on the top of the first block.

In accordance with another aspect of the exemplary embodiments, there is provided a spatial prediction apparatus for coding a residual image in layered video coding, the apparatus including a block activity determination unit for selecting at least one of a default mode, a horizontal mode and a vertical mode as a spatial prediction mode, taking into account an activity of at least one adjacent block located adjacent to a first block among blocks included in the residual image; and a spatial prediction unit for coding differences between pixels of the first block and pixels of a prediction bock constructed by one of the selected at least one or more spatial prediction modes. The at least one adjacent block includes a first adjacent block located on the left of the first block and a second adjacent block located on the top of the first block.

BRIEF DESCRIPTION OF THE DRAWINGS

The above and other aspects, features and advantages of certain exemplary embodiments will be more apparent from the following description taken in conjunction with the accompanying drawings, in which:

FIGS. 4A to 4C are diagrams showing examples of spatial prediction based on locations and pixels of adjacent blocks needed to perform spatial prediction according to an exemplary embodiment.

Throughout the drawings, the same drawing reference numerals will be understood to refer to the same elements, features and structures.

DETAILED DESCRIPTION OF EXEMPLARY EMBODIMENTS

Exemplary embodiments will now be described in detail with reference to the accompanying drawings. In the following description, specific details such as detailed configuration and components are merely provided to assist the overall understanding of exemplary embodiments. In addition, descriptions of well-known functions and constructions are omitted for clarity and conciseness. Expressions such as "at least one of," when preceding a list of elements, modify the entire list of elements and do not modify the individual elements of the list.

In the following description of the exemplary embodiments, a layered video processing system is considered as a video processing system that processes both low-resolution videos and high-resolution videos. However, the exemplary embodiments may be applied to any video processing systems that process both the low-resolution videos and the high-resolution videos.

The layered video processing system supports the low-resolution videos and the high-resolution videos using original videos. For example, the low-resolution videos may include progressive videos, while the high-resolution videos may include interlaced videos.

The exemplary embodiments are directed to performing, during layered video coding, spatial prediction using a spatial correlation between blocks existing in a residual image generated from a difference between an input video and a video (hereinafter 'restored video') restored from a basement layer's video, thereby improving a compression rate of the input video. The basement layer's video may be a low-resolution video, while the input video may be a high-resolution video.

Now, a layered video coding method and apparatus according to an exemplary embodiment will be described in detail with reference to the accompanying drawings.

Figure 1:
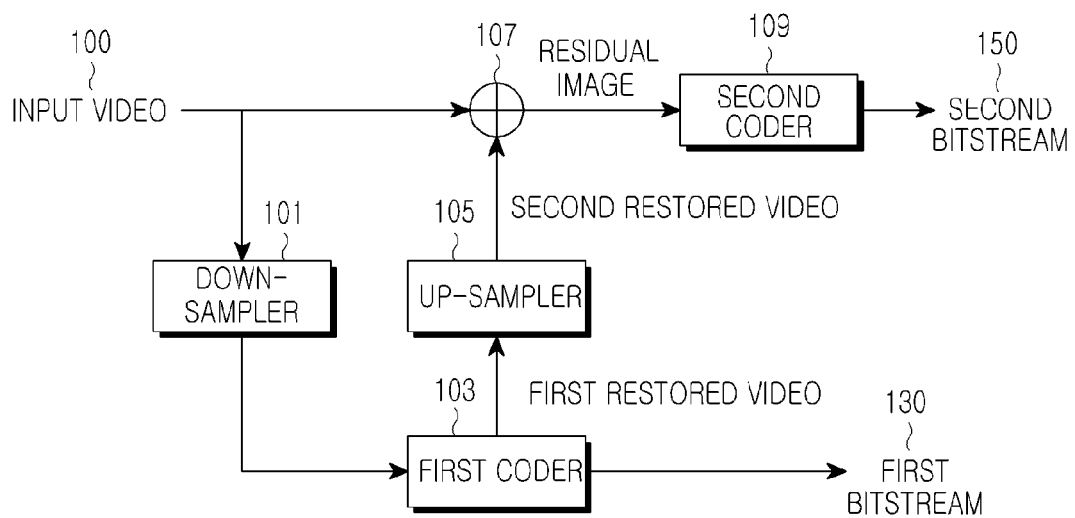
FIG. 1 is a diagram showing a layered video coder to which an exemplary embodiment is applied.
Figure 2:
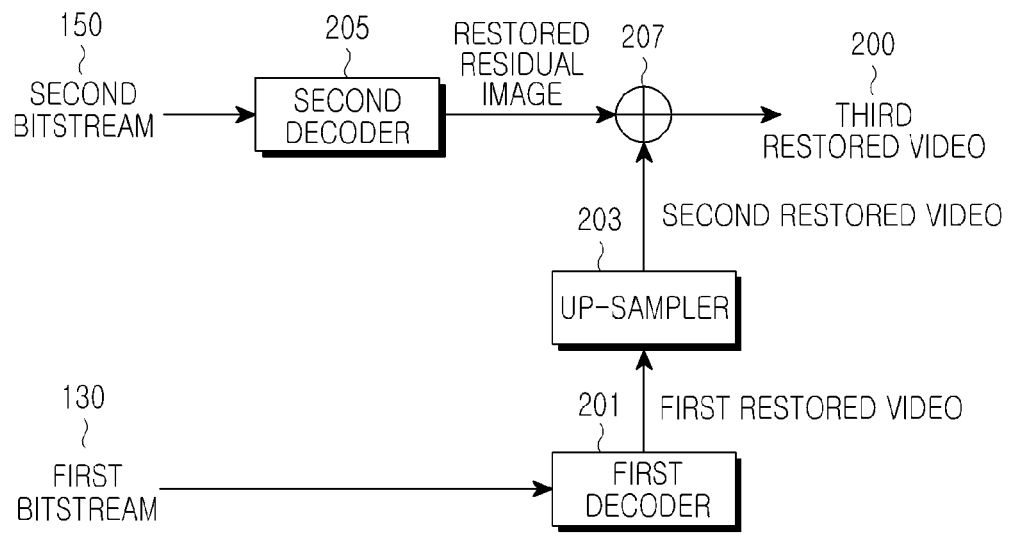
FIG. 2 is a diagram showing a layered video decoder to which an exemplary embodiment is applied.

FIG. 1 shows a layered video coder and FIG. 2 shows a layered video decoder. While 2-layered structures are shown in FIGS. 1 and 2 for the sake of convenience, the exemplary embodiments may be applied to common M-layered structures (where M>2). The layered video coder of FIG. 1 and the layered video decoder of FIG. 2 perform an operation of increasing transmission efficiency during data transmission/reception by improving a data compression rate.

The layered video coder receives a high-resolution video and outputs a coded low-resolution video and a residual image. The residual image before undergoing coding is defined as a pixel value acquired by a difference between the input high-resolution video and a high-resolution video restored in the layered video coder.

The layered video decoder receives a coded basement layer's low-resolution video and a coded enhancement layer's residual image, provided from the layered video coder, and outputs a restored low-resolution video and a restored high-resolution video.

First, referring to FIG. 1, the layered video coder includes a down-sampler 101, a first coder 103, an up-sampler 105, an addition/subtraction unit 107, and a second coder 109.

The down-sampler 101 generates a basement layer's video, or a low-resolution video, by down-sampling an input video 100, or a high-resolution video, and provides the generated low-resolution video to the first coder 103.

The first coder 103 generates a first bitstream 130 by coding the provided low-resolution video, and provides the generated first bitstream 130 to the layered video decoder of FIG. 2. The first coder 103 restores a bitstream for the coded low-resolution video and provides a first restored video to the up-sampler 105.

The up-sampler 105 generates a second restored video by performing up-sampling corresponding to a reverse process of the down-sampling on the provided first restored video, and provides the generated second restored video to the addition/subtraction unit 107. The addition/subtraction unit 107 subtracts the provided second restored video from the input video 100, and provides a residual image corresponding to a difference between the input video 100 and the second restored video, to the second coder 109.

The second coder 109 generates a second bitstream 150 by coding the provided residual image, and provides the generated second bitstream 150 to the layered video decoder of FIG. 2.

It is preferable, but not necessary, that in the structure of the layered video coder, the first coder 103 corresponds to the basement layer for coding low-resolution videos, while the second coder 109 corresponds to the enhancement layer for processing high-resolution videos.

Referring to FIG. 2, the layered video decoder includes a first decoder 201, an up-sampler 203, a second decoder 205, and an addition/subtraction unit 207.

The first decoder 201 receives the first bitstream 130 corresponding to a low-resolution or low-definition video from the layered video coder of FIG. 1, restores the input first bitstream 130, and provides a first restored video to the up-sampler 203. The up-sampler 203 generates a second restored video by up-sampling the provided first restored video, and provides the generated second restored video to the addition/subtraction unit 207.

The second decoder 205 receives the second bitstream 150 corresponding to the residual image from the layered video coder of FIG. 1, generates a restored residual image by performing, on the input second bitstream 150, decoding corresponding to the coding in the second coder 109 of FIG. 1, and provides the restored residual image to the addition/subtraction unit 207.

The addition/subtraction unit 207 adds the restored residual image to the provided second restored video, and provides a third restored video 200 corresponding to the addition of the restored residual image and the provided second restored video, to the user. The third restored video 200 corresponds to a high-resolution or high-definition video.

In the case of layered video coding of FIG. 1, even the residual image obtained by subtracting the second restored video restored from the basement layer from the input video 100 has not only an inter-picture time correlation but also an intra-picture spatial correlation. The reason is that the residual image generally consists of high-frequency components removed by low-pass filtering in the down-sampler 101 of FIG. 1, and the high-frequency components of the residual image still have the spatial correlation.

Based on this, the exemplary embodiments provide a new approach to improving a compression rate of the input video 100 by efficiently using the spatial correlation existing in the high-frequency components of the residual image. To this end, in an exemplary embodiment, the second coder 109 performs spatial prediction using the spatial correlation existing in the high-frequency components of the residual image in accordance with FIGS. 3 to 5.

Figure 3:
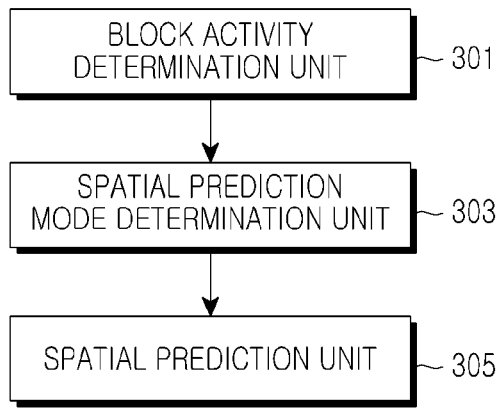
FIG. 3 is a diagram showing a structure of a second coder 109 for performing spatial prediction according to an exemplary embodiment.

FIG. 3 shows a structure of the second coder 109 for performing spatial prediction according to an exemplary embodiment.

Referring to FIG. 3, the second coder 109 according to an exemplary embodiment includes a block activity determination unit 301, a spatial prediction mode determination unit 303, and a spatial prediction unit 305.

For spatial prediction of a residual image, the block activity determination unit 301 divides the residual image into blocks, and selects at least one spatial prediction mode to be applied to the current block, using information (e.g., activities of pixels in adjacent blocks) about adjacent blocks, for each of the divided blocks. The spatial prediction modes include a HORIZONTAL mode for performing spatial prediction in the horizontal direction, a VERTICAL mode for performing spatial prediction in the vertical direction, and a DEFAULT mode for performing spatial prediction using a preset particular value instead of the pixels in adjacent blocks.

The spatial prediction mode determination unit 303 determines an optimal mode among at least one or more spatial prediction modes selected by the block activity determination unit 301. The spatial prediction unit 305 performs spatial prediction on the current block in the residual image according to the determined optimal mode. The spatial prediction mode determination unit 303 is not included in the layered video decoder. Instead, the layered video decoder performs the least operation for decoding bitstreams corresponding to the optimal mode determined by the layered video coder.

Detailed operations of the devices 301 to 305 for performing spatial prediction will be described below.

Figure 4A:
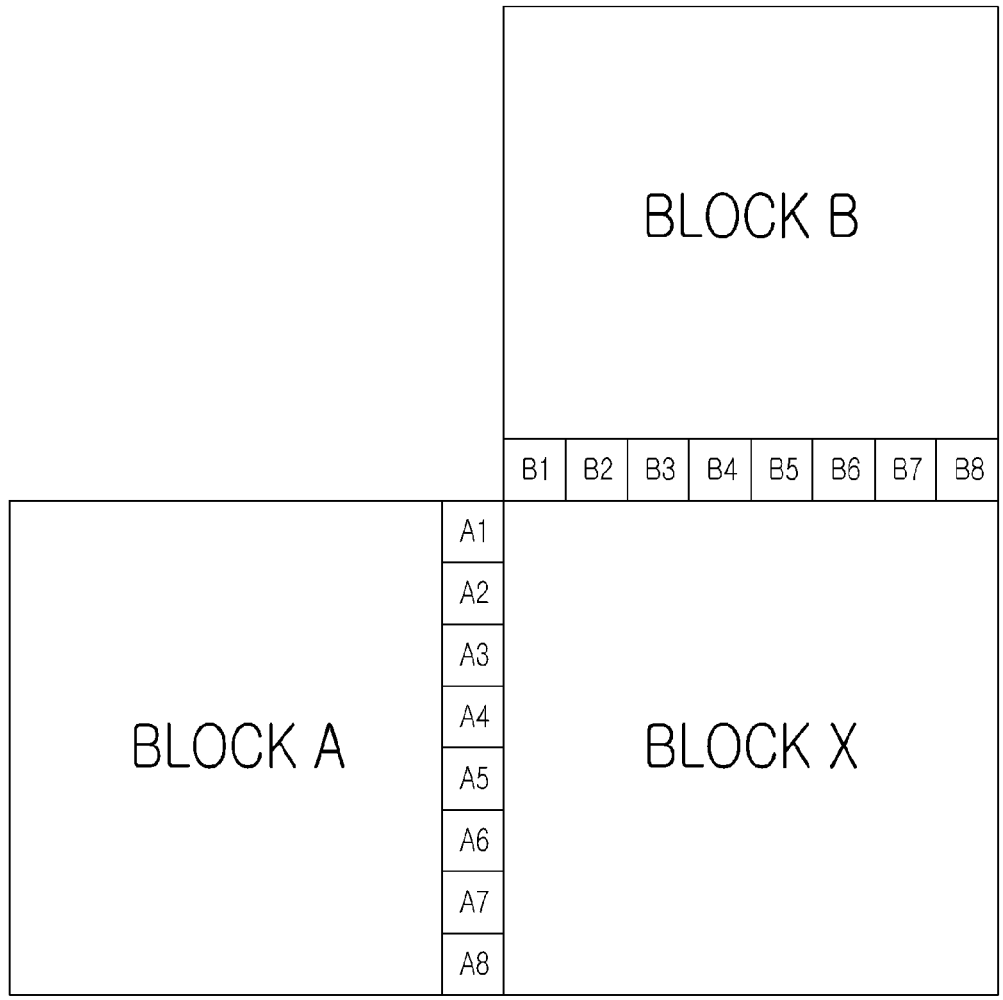

The block activity determination unit 301 determines activities of blocks A and B in an input residual image, using information (one of the following Conditions 1 to 5) about the blocks A and B formed in the vicinity of the current block X as shown in FIG. 4A, and selects at least one spatial prediction mode to be applied to the current block X according to the determination results.

Figures 4B, 4C:
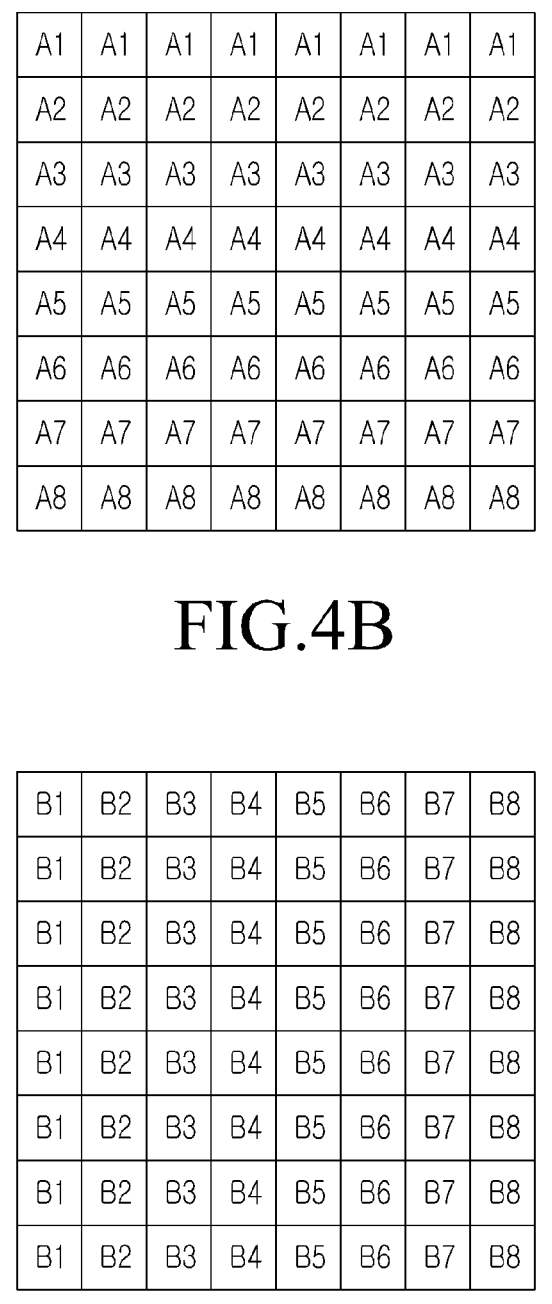

FIGS. 4A to 4C show examples of spatial prediction based on locations and pixels of adjacent blocks needed to perform spatial prediction according to an exemplary embodiment. While 8×8 blocks are used in FIGS. 4A to 4C by way of example, the blocks are not limited in size. Generally, exemplary embodiments may be applied to N×N blocks.

As shown in FIG. 4A, an adjacent block A located on the left of the current block X and an adjacent block B located on the top of the current block X are used for spatial prediction. To be specific, among the pixels in the adjacent blocks A and B of the current block X, pixels A1-A8 adjacent to the current block X within the block A and pixels B1-B8 adjacent to the current block X within the block B are used for spatial prediction.

In the HORIZONTAL mode for performing spatial prediction in the horizontal direction, an 8×8 prediction block is made using pixels A1-A8 of the block A as shown in FIG. 4B, and in the VERTICAL mode for performing spatial prediction in the vertical direction, an 8×8 prediction block is made using pixels B1-B8 of the block B as shown in FIG. 4C. These prediction blocks are used as spatial prediction values for the block X in the spatial prediction unit 305.

Turning back to the block activity determination unit 301 in FIG. 3, the block activity determination unit 301 determines activities of the blocks A and B as follows, using the pixels A1-A8 and B1-B8 in the blocks A and B, and coding mode information of the blocks A and B, as shown in FIG. 4A.

The blocks are classified into high-activity blocks and low-activity blocks according to their activities. One of the following Conditions 1 to 5 is used as a criterion for determining the block activities. In the case where any one condition is used, if blocks K (a block including pixels A1-A8 and a block including pixels B1-B8) given in the blocks A and B satisfy the condition, the blocks K are determined to have low activities, and otherwise, determined to have high activities.

Condition 1: all pixels in the block K are 0 in value.
Condition 2: a Coded Block Pattern (CBP) value of the block K is 0.
Condition 3: the block K is in a SKIP mode.
Condition 4: values of pixels to be used for spatial prediction in the block K are all the same (for example, K1=K2=K3=K4=K5=K6=K7=K8).
Condition 5: if a difference between values of pixels to be used for spatial prediction in the block K is less than a threshold TH, the relationship can be represented by $$\sum_{i=1}^{8} |K_{i+1} - K_i| < TH \quad (1)$$

The block activity determination unit 301 determines block activities of the blocks A and B including the block K, using one of Conditions 1 to 5, and selects at least one spatial prediction mode to be applied to spatial prediction for the current block X in the residual image according to the block activities of the blocks A and B, which are determined as in Table 1, by way of example.

TABLE 1

| Block Activity | Spatial Prediction Mode |
| --- | --- |
| Block A = Low activity<br>Block B = Low activity | DEFAULT |
| Block A = High activity<br>Block B = Low activity | DEFAULT, HORIZONTAL |

TABLE 1-continued

| Block Activity | Spatial Prediction Mode |
| --- | --- |
| Block A = Low activity<br>Block B = High activity | DEFAULT, VERTICAL |
| Block A = High activity<br>Block B = High activity | DEFAULT, HORIZONTAL, VERTICAL |

As shown in Table 1, if both the blocks A and B are determined as low-activity blocks, the block activity determination unit 301 selects the DEFAULT mode as a spatial prediction mode for the current block X. If the block A is determined as a high-activity block and the block B is determined as a low-activity block, the block activity determination unit 301 selects the DEFAULT and HORIZONTAL modes as spatial prediction modes for the current block X. If the block A is determined as a low-activity block and the block B is determined as a high-activity block, the block activity determination unit 301 selects the DEFAULT and VERTICAL modes as spatial prediction modes for the current block X. If the blocks A and B are both determined as high-activity blocks, the block activity determination unit 301 selects the DEFAULT, HORIZONTAL and VERTICAL modes as spatial prediction modes for the current block X.

The block activity determination unit 301 provides information about the selected spatial prediction modes to the spatial prediction mode determination unit 303 on a block-by-block basis. Because the types of the spatial prediction mode are changed according to the block activities of the adjacent blocks as shown in Table 1, the block activity determination unit 301 selectively performs even the entropy coding for the spatial prediction modes depending on the activity conditions of the adjacent blocks. For example, if the blocks A and B are both determined as low-activity blocks, the block activity determination unit 301 does not transmit information about the spatial prediction mode because only the DEFAULT mode is selected as a spatial prediction mode. If the block A is determined as a high-activity block and the block B is determined as a low-activity block, the block activity determination unit 301 represents the mode information with 1 bit because two modes of the DEFAULT and HORIZONTAL modes are selected. Similarly, even if the block A is determined as a low-activity block and the block B is determined as a high-activity mode, the block activity determination unit 301 represents the mode information with 1 bit because two modes of the DEFAULT and VERTICAL modes are selected. In addition, if the blocks A and B are both determined as high-activity blocks, the block activity determination unit 301 represents the mode information with 2 bits (DEFAULT=00, HORIZONTAL=10, VERTICAL=01) because three modes of DEFAULT, HORIZONTAL and VERTICAL modes are selected.

The spatial prediction mode determination unit 303 determines an optimal mode among the selected at least one or more spatial prediction modes considering a compression rate and distortion of the residual image. A method of selecting the optimal mode follows the optimal mode decision method generally used in the video coder. For example, an optimal mode decision method based on the compression rate and distortion may be used, which is used in the MPEG-4 or H.264 video compression codec. The spatial prediction mode determination unit 303 may calculate an RD cost defined by Equation (1) below, using a bit rate R and a distortion D. The bit rate R corresponds to a bit rate that occurs when coding is performed in the selected at least one spatial prediction mode. The distortion D corresponds to a distortion between the original video and the video that is restored when coding and decoding are performed in the selected at least one spatial prediction mode.

$$RD\ cost = R \times \lambda + D \qquad (2)$$

where D denotes a Sum of Squared Error (SSE) between the original video and the restored video, and λ denotes a predefined constant.

The spatial prediction mode determination unit 303 calculates an RD cost for the selected at least one spatial prediction mode, and determines a spatial prediction mode, the calculated RD cost of which is the smallest value, as an optimal mode.

The spatial prediction unit 305 performs spatial prediction on the current block in the residual image according to the determined optimal mode. For example, if the determined optimal mode is the DEFAULT mode, the spatial prediction unit 305 calculates a difference between a preset value such as, for example, 128, and each pixel values of the current block, without using the block A or B, and performs spatial prediction by coding the calculated differences. If the optimal mode determined for the current block in the residual image is the HORIZONTAL mode, the spatial prediction unit 305 constructs a prediction block for spatial prediction as shown in FIG. 4B, calculates differences between pixels in the current block and pixels in the constructed prediction block, and performs spatial prediction by coding the calculated differences. If the optimal mode determined for the current block in the residual image is the VERTICAL mode, the spatial prediction unit 305 constructs a prediction block for spatial prediction as shown in FIG. 4C, calculates differences between pixels in the current block and pixels in the constructed prediction block, and performs spatial prediction by coding the calculated differences.

Figure 5:
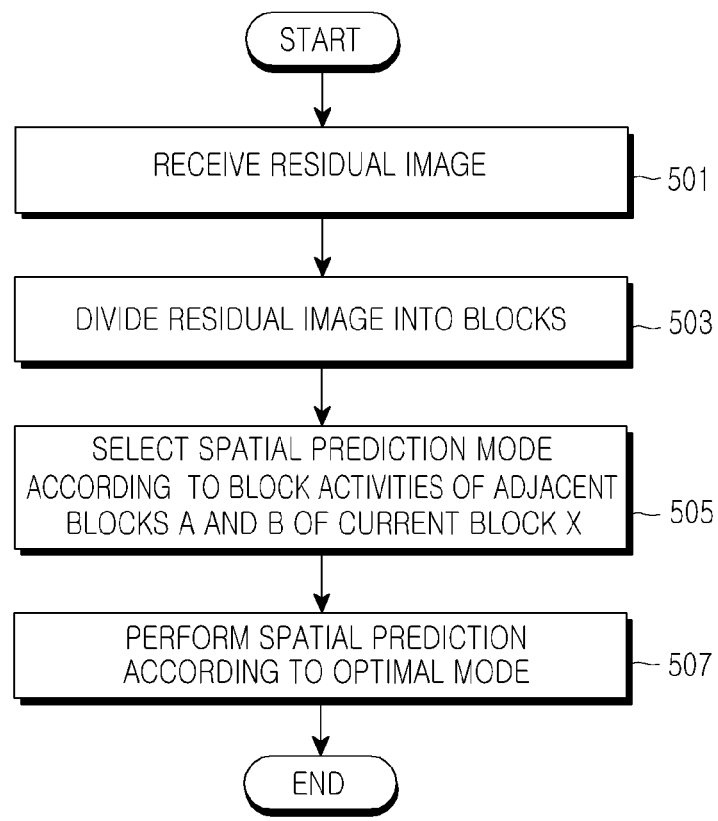
FIG. 5 is a diagram showing a spatial prediction method according to an exemplary embodiment.

FIG. 5 shows a spatial prediction method according to an exemplary embodiment.

Referring to FIG. 5, if a residual image is input in operation 501, the block activity determination unit 301 divides the residual image into blocks in operation 503.

In operation 505, for every block included in the residual image, the block activity determination unit 301 determines block activities of the adjacent blocks A and B of the current block X, using one of Conditions 1 to 5, and then selects at least one spatial prediction mode according to the determined activities of the blocks A and B, which are mapped to spatial prediction modes as defined in Table 1.

In addition, for each block included in the residual image, the spatial prediction mode determination unit 303 included in the layered video coder determines an optimal mode among the selected at least one or more spatial prediction modes using Equation (2).

In operation 507, for each block included in the input residual image, the spatial prediction unit 505 constructs a prediction block for spatial prediction according to the determined optimal mode, calculates differences pixels in the current block X and pixels in the prediction block, and performs spatial prediction by coding the calculated differences.

As a result, in an exemplary embodiment, during layered video coding, spatial prediction is performed using a spatial correlation between pixels or blocks existing in a residual image generated from a difference between an input image and a video restored from the basement layer, thereby improving a compression rate of the input video.

While the inventive concepts have been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A spatial prediction method for coding a residual image, comprising:
   selecting, as a spatial prediction mode, at least one from among a default mode, a horizontal mode, and a vertical mode, based on an activity of at least one adjacent block located adjacent to a first block among blocks included in the residual image, the residual image being generated from a difference between an input video and a video restored from a basement layer generated by performing down-sampling on the input video in layered video coding; and
   coding differences between pixels of the first block and pixels of a prediction block constructed based on the spatial prediction mode;
   wherein the at least one adjacent block includes a first adjacent block located on a left of the first block and a second adjacent block located on a top of the first block.

2. The spatial prediction method of claim 1, further comprising determining the spatial prediction mode as an optimal mode.

3. The spatial prediction method of claim 1, wherein activities of the first and the second adjacent blocks are determined by at least one of pixel activities, Coded Block Patterns (CBPs), and skip mode information of predetermined blocks in the first and the second adjacent blocks.

4. The spatial prediction method of claim 3, wherein the predetermined block in the first adjacent block includes pixels adjacent to the left of the first block, and the predetermined block in the second adjacent block includes pixels adjacent to the top of the first block.

5. The spatial prediction method of claim 3, wherein the selecting comprises:
   selecting the default mode, if the determined activities of the first and the second adjacent blocks are lower than a threshold;
   selecting the default mode and the horizontal mode, if the determined activity of the first adjacent block is higher than the threshold and the determined activity of the second adjacent block is lower than the threshold;
   selecting the default mode and the vertical mode, if the determined activity of the first adjacent block is lower than the threshold and the determined activity of the second adjacent block is higher than the threshold; and
   selecting the default mode, the horizontal mode and the vertical mode, if the determined activities of the first and the second adjacent blocks are higher than the threshold.

6. The spatial prediction method of claim 2, wherein the coding comprises:
   constructing the prediction block based on the determined optimal mode;
   calculating differences between pixels of the first block and pixels of the prediction block; and
   coding the calculated differences.

7. The spatial prediction method of claim 6, wherein the constructing the prediction block comprises:
   constructing a prediction block including predetermined default values, if the determined optimal mode is the default mode;
   constructing a prediction block including pixels of the first adjacent block adjacent to the first block, if the determined optimal mode is the horizontal mode; and
   constructing a prediction block including pixels of the second adjacent block adjacent to the first block, if the determined optimal mode is the vertical mode.

8. A spatial prediction apparatus for coding a residual image, comprising:
- a block activity determination unit that selects, as a spatial prediction mode, at least one from among a default mode, a horizontal mode, and a vertical mode, based on an activity of at least one adjacent block located adjacent to a first block among blocks included in the residual image, the residual image being generated from a difference between an input video and a video restored from a basement layer generated by performing down-sampling on the input video in layered video coding; and
- a spatial prediction unit that codes differences between pixels of the first block and pixels of a prediction block constructed by the spatial prediction mode;
- wherein the at least one adjacent block includes a first adjacent block located on a left of the first block and a second adjacent block located on a top of the first block.

9. The spatial prediction apparatus of claim 8, further comprising a spatial prediction mode deciding unit that determines the spatial prediction mode as an optimal mode.

10. The spatial prediction apparatus of claim 8, wherein activities of the first and the second adjacent blocks are determined by at least one of pixel activities, Coded Block Patterns (CBPs), and skip mode information of predetermined blocks in the first and the second adjacent blocks.

11. The spatial prediction apparatus of claim 10, wherein the predetermined block in the first adjacent block includes pixels adjacent to the left of the first block, and the predetermined block in the second adjacent block includes pixels adjacent to the top of the first block.

12. The spatial prediction apparatus of claim 10, wherein the block activity determination unit selects the default mode, if the determined activities of the first and the second adjacent blocks are lower than a threshold; selects the default mode and the horizontal mode, if the determined activity of the first adjacent block is higher than the threshold and the determined activity of the second adjacent block is lower than the threshold; selects the default mode and the vertical mode, if the determined activity of the first adjacent block is lower than the threshold and the determined activity of the second adjacent block is higher than the threshold; and selects the default mode, the horizontal mode and the vertical mode, if the determined activities of the first and the second adjacent blocks are higher than the threshold.

13. The spatial prediction apparatus of claim 9, wherein the spatial prediction unit constructs a prediction block based on the determined optimal mode; calculates differences between pixels of the first block and pixels of the prediction block; and codes the calculated differences.

14. The spatial prediction apparatus of claim 13, wherein in constructing the prediction block, the spatial prediction unit constructs a prediction block including predetermined default values, if the determined optimal mode is the default mode; constructs a prediction block including pixels of the first adjacent block adjacent to the first block, if the determined optimal mode is the horizontal mode; and constructs a prediction block including pixels of the second adjacent block adjacent to the first block, if the determined optimal mode is the vertical mode.

* * * * *